(12) United States Patent
Maus et al.

(10) Patent No.: US 7,419,738 B2
(45) Date of Patent: Sep. 2, 2008

(54) MODULE FOR A FUEL CELL ARRANGEMENT COMPRISING PLATES JOINED BY A SEAL

(75) Inventors: Karl-Heinz Maus, Wuppertal (DE); Werner Heinl, Burscheid (DE); Hans-Joachim vom Stein, Leverkusen (DE)

(73) Assignee: AB SKF, Gothenburg (SE)

( * ) Notice: Subject to any disclaimer, the term of this patent is extended or adjusted under 35 U.S.C. 154(b) by 492 days.

(21) Appl. No.: 10/694,816

(22) Filed: Oct. 29, 2003

(65) Prior Publication Data

US 2004/0180255 A1 Sep. 16, 2004

(30) Foreign Application Priority Data

Oct. 30, 2002 (DE) ................ 102 50 434

(51) Int. Cl.
*H01M 2/08* (2006.01)
(52) U.S. Cl. .................. 429/35; 429/36; 429/40; 429/32
(58) Field of Classification Search .......... 429/34, 429/35, 36, 40, 32; 427/115; 264/240, 241, 264/45.1, 340, 331.11
See application file for complete search history.

(56) References Cited

U.S. PATENT DOCUMENTS

| | | | | |
|---|---|---|---|---|
| 3,615,840 A | * | 10/1971 | Wolfe, Jr. | 429/44 |
| 6,338,492 B1 | * | 1/2002 | Schilling et al. | 277/630 |
| 6,440,594 B1 | * | 8/2002 | Kindler et al. | 429/13 |
| 2003/0235744 A1 | | 12/2003 | Pflaesterer | |
| 2004/0058221 A1 | | 3/2004 | Chaix | |

FOREIGN PATENT DOCUMENTS

| | | | |
|---|---|---|---|
| CA | 2320647 | | 4/2001 |
| CA | 2345852 | | 11/2001 |
| DE | 19910487 | C1 | 3/1999 |
| DE | 100 28 395 | A1 | 12/2000 |
| DE | 10028395 | A1 | 12/2000 |
| DE | 10048871 | A1 | 3/2002 |
| EP | 0918362 | A2 | 5/1999 |
| EP | 0 951 086 | A2 | 10/1999 |
| EP | 0951086 | * | 10/1999 |
| EP | 1 009 051 | A2 | 6/2000 |
| EP | 1 032 065 | A2 | 8/2000 |
| EP | 1032065 | A2 | 8/2000 |
| EP | 1 098 380 | A1 | 5/2001 |
| EP | 1 265 303 | A1 | 12/2002 |
| EP | 1263068 | A1 | 12/2002 |
| EP | 1 320 142 | A2 | 6/2003 |
| JP | 2001-338673 | * | 12/2001 |
| JP | 2001-338673 | A | 12/2001 |
| WO | WO 99/04446 | A1 | 1/1999 |
| WO | WO 01/80339 | A2 | 10/2001 |
| WO | WO 02/059995 | A1 | 8/2002 |
| WO | 03/058731 | | 7/2003 |

* cited by examiner

*Primary Examiner*—Raymond Alejandro
(74) *Attorney, Agent, or Firm*—Buchanan, Ingersoll & Rooney PC

(57) ABSTRACT

A module for a fuel cell arrangement having several stacked plates. At least two of the plates have a common seal element of polymer material which is injected onto the plates and by which the plates are at least partially joined to one another. The plates can be provided with openings into which the seal element extends. The plates can be configured so that a cavity is defined between the plates, with the openings communicating with the cavity. The seal element can also have different cross-sectional configurations.

20 Claims, 4 Drawing Sheets

MODULE FOR A FUEL CELL ARRANGEMENT COMPRISING PLATES JOINED BY A SEAL

This application is based on and claims priority under 35 U.S.C. § 119 with respect to German Application No. 102 50 434.2 filed on Oct. 30, 2002, the entire content of which is incorporated herein by reference.

FIELD OF THE INVENTION

The invention generally relates to the sealing of fuel cells. More particularly, the present invention pertains to a module for a fuel cell arrangement, a process for producing such a module and a fuel cell arrangement produced with such a module.

BACKGROUND OF THE INVENTION

Fuel cell arrangements are used to produce electrical energy by a chemical reaction and can be implemented, for example, in the form of a block which has a host of individual modules stacked on top of one another and in which the chemical reaction proceeds in each module. The reaction partners are often supplied to the fuel cell in a gaseous state, for example in the form of hydrogen and oxygen or air, and so reliable sealing of the fuel cell arrangement is necessary.

One example of a seal for fuel cells is described in German Offenlegungsschrift No. DE 100 28 395 A1. This document discloses a seal having a carrier body with elastomer material located on it. The elastomer material is applied to the support body in the form of a liquid rubber vulcanizate and is then cross-linked or vulcanized.

European Patent Publication No. EP 1 032 065 A2 discloses a seal arrangement especially for bipolar plates with interposed ion exchange-membrane units in fuel cells. In this seal arrangement, the seal elements of polymer material are injected into recesses of the bipolar plates and, with the pertinent bipolar plate, form an integral unit. The seal elements do not completely fill the recesses. Instead, empty spaces or gaps remain between the side walls of the seal elements and the adjacent walls of the recesses. This ensures that the seal elements can give when compressed. Moreover the seal elements project out of the recesses, i.e. the height of the seal elements is greater than the depth of the recesses.

SUMMARY OF THE INVENTION

A module for a fuel cell arrangement having several stacked plates is configured so that at least two of the plates have a common seal element of polymer material which is injected onto the plates and by which the plates are at least partially joined to one another. This arrangement makes it possible to reduce the number individual parts necessary for assembling the fuel cell arrangement with a comparatively small number of working steps. At the same time, the seal element can mechanically fix the plates without engaging in significant additional measures.

The plates can be connected to one another via the sealing element by adhesion. Likewise the plates can also be interlocked to one another. Further, a combination of the two types of connections is also possible. In this way generally, it is possible to produce a connection between the plates which is suitable for the respective application.

The seal element is preferably made on the two main surfaces of the stack which is formed by the plates. When the modules are stacked on top of one another into a fuel cell arrangement, relatively good sealing between the modules can be achieved. Also, the seal element can seal the intermediate space formed between adjacent plates. Thus, by way of the seal element, it is possible to achieve not only sealing between the individual modules, but also sealing between the individual plates of a module.

It is possible to configure and position the seal element so that it encompasses the end faces of the plates, at least in areas. It is also possible for the seal element to extend through at least one opening in the plates. To do this, in adjacent plates especially, oblong openings can be formed, with the openings of one plate and the openings of the other plate overlapping. The seal element can also extend in at least one tunnel-like cavity between the plates. Generally the tunnel-like cavity has at least one opening.

Numerous variations for the specific configuration of the connection of the plates by way of the seal element are possible. In preferred forms of all embodiments, both an adhesive and a positive (mechanical) connection can be produced. Moreover, there is the possibility of likewise sealing the intermediate space between the plates.

The seal element can be configured in a variety of different forms. For example, the seal element in the area or on the side of one of the plates can have a cross-sectional shape or area with a flat surface. It is also possible for the seal element to have a cross-sectional area or shape with a tapering surface in the area or on the side of one of the plates. These two possibilities can also be combined with one another such that the seal element on one side of the module has a flat surface and on the other side has a tapering surface. When the modules are stacked on top of one another into a fuel cell arrangement, the tapering surface of the seal element of one module adjoins the flat surface of the seal element in an adjacent module so that relatively good seal action can be achieved.

In another variation, the seal element in the area or one the side of the same plate has a cross-sectional area or shape with a flat surface and a cross-sectional area or shape with a tapering surface. Each cross-sectional area or shape with the flat surface can be separated from the cross-sectional area or shape with the tapering surface by a recess relative to the flat surface. In this embodiment of the seal element, when the modules are stacked on top of one another, the cross-sectional areas or shapes with a flat surface are used as a stop up to which the cross-sectional areas with a tapering surface can be compressed to the maximum degree. The recesses increase the flexibility of the cross-sectional areas or shapes with a tapering surface and hold the material which has been displaced when these cross-sectional areas or shapes are compressed. Thus, relatively simple handling of the modules is possible when stacked on top of one another into a fuel cell arrangement and the seal elements are protected against damage by excessive compression of the cross-sectional areas or shapes with the tapering surface. The seal elements according to this embodiment, when the modules are stacked on top of one another, can interact either with seal elements which are made completely flat or with the similar seal elements. To implement the latter combination, the cross-sectional areas or shapes with the flat surface can be made asymmetrical on either side of the cross-sectional area or shape with the tapering surface so that when two seal elements are stacked on top of one another, the cross-sectional areas or shapes with a tapering surface each adjoin the cross-sectional area or shape with the flat surface of the other seal element at the time and thus two successively connected seal points are formed.

A process for producing a module for a fuel cell arrangement comprises inserting at least areas of at least two plates into a casting mold, and filling the casting mold with a polymer seal material so that the seal material adjoins the two plates. Thus a seal element can be formed relatively efficiently for several plates at the same time, and in the same process step even a mechanical connection between the plates can be produced.

Another aspect of the invention involves a fuel cell arrangement comprising several individual components arranged in a stack. The individual components comprise at least two stacked plates which are at least partially joined to one another by a common seal element of polymer material which is injected onto the plates to form a module.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION

Figure 1:
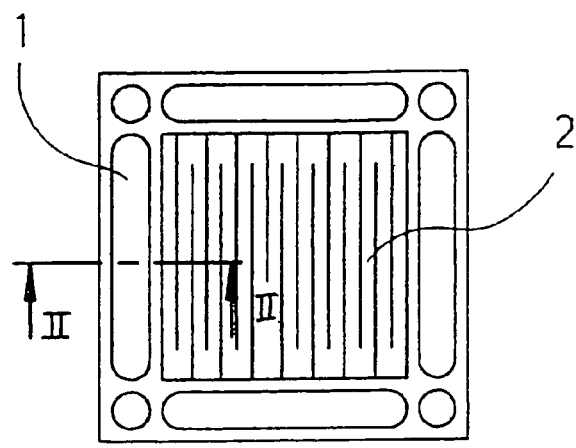
FIG. 1 is a plan view of a fuel cell arrangement utilizing a module according to the disclosed subject matter.

FIG. 1 illustrates a fuel cell arrangement employing a module. The fuel cell arrangement is typically operated with the gases hydrogen and oxygen or air and converts them into water upon the generation of electrical energy. The fuel cell arrangement shown in FIG. 1 is comprised of a host of individual elements which are each made as rectangular plates or as layers, and are located on top of one another in a stack. To supply the individual elements located in different planes with the required gas, or to discharge the water which has formed, shafts or 1 which are sealed in a gas-tight manner extend through the entire stack perpendicular to the individual plates or layers. From these shafts, channels 2 now and then branch transversely and laterally distribute the medium which has been conveyed in the shafts 1.

Figure 2:
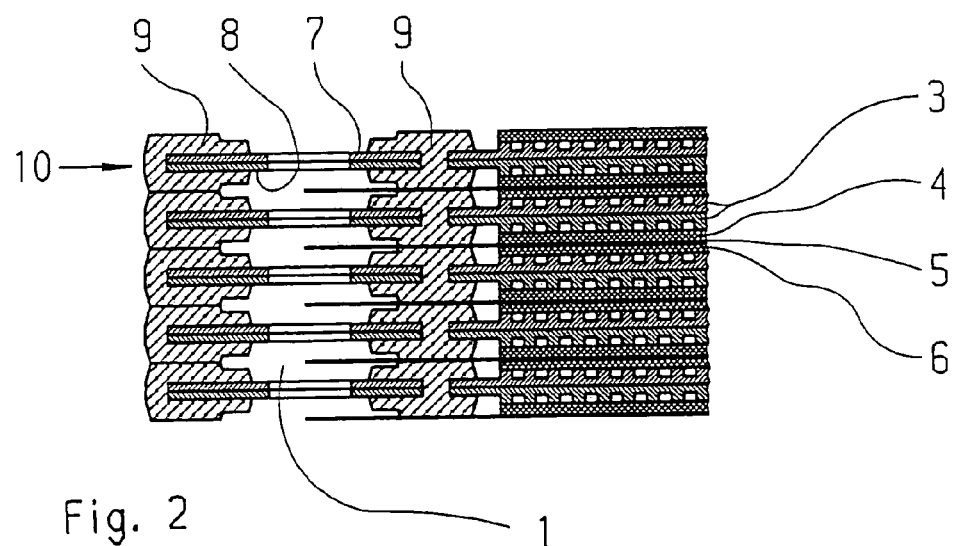
FIG. 2 is a cross-sectional view of the fuel cell arrangement taken along the section line II-II in FIG. 1.

Referring to the cross-sectional view of FIG. 2, the fuel cell arrangement is comprised of a periodically repeating sequence of electrodes 3, first catalyst plates 4, membranes 5 and second catalyst plates 6 which each form a fuel cell with the addition of another electrode 3. One aspect of the disclosed subject matter is that the electrodes 3 are each composed of two thin plates 7, 8. The plates 7, 8 forming each electrode 3 adjoin one another at their main surfaces and are held together by a seal element 9 of polymer material so that a module 10 is formed. The seal element 9 assumes a static function in which it mechanically holds together the two plates 7, 8. In addition, as shown in FIG. 2, the seal element 9 can also be considered to perform a seal function by which the seal elements 9 stacked on top of one another seal, for example, the shaft 1. In doing so, it is possible to design the seal elements 9 such that the fuel cell arrangement can be completely sealed without additional seals.

To produce the module 10, two plates 7, 8 at a time are inserted into an injection mold with the desired positioning relative to one another at least in the areas in which the seal element 9 is to be formed and are extrusion-coated with a sprayable polymer material. The two plates 7, 8 are joined to one another by the injection mold material by adhesion and/or interlocking. If desired, in this way the abutting area between the two joined plates 7 and 8 can be hermetically sealed. The module 10 which has been produced in this way can be processed as a unit in the assembly of the fuel cell arrangement.

Various other embodiments of the module 10 are shown in FIGS. 3-10 and are discussed below. Generally speaking, various embodiments illustrated in FIGS. 3-7 differ from one another at least in part by the formation of the plates 7, 8 in the area of the seal element 9 from one another. The embodiments of FIGS. 8-10 differ at least in part with respect to the execution of the seal element 9.

Figure 3:
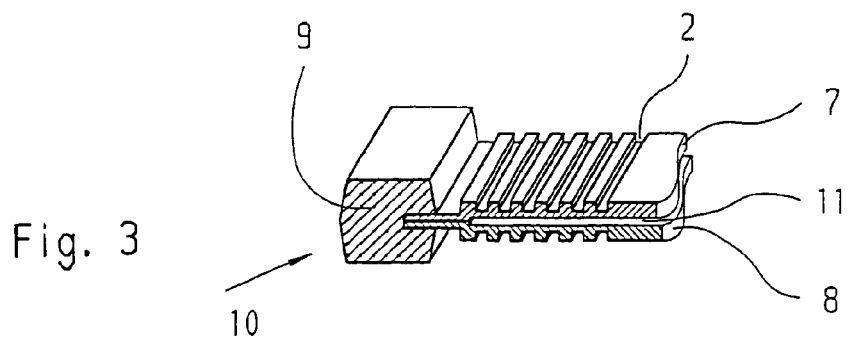
FIG. 3 is a perspective view of an embodiment of the module used in a fuel cell arrangement.

In the embodiment of the module 10 shown in FIG. 3, the seal element 9 encompasses the end faces of the two plates 7, 8 and is shaped identically on the two sides of the plates. The cross-section of the sealing element 9 has the general shape of a trapezoid, with the two parallel opposing sides of the trapezoid extending parallel to the plates 7, 8. Thus, both in the area of one of the plates 7 and also in the area of the other plate 8 there is a flattened seal profile which tapers in a narrowing manner with increasing distance from the plate surface. In addition, in this embodiment, an intermediate space 11 is formed between the plates 7, 8. Because the seal element 9 encompasses the end faces of the two plates 7, 8, at the same time the seal element seals the intermediate space 11 from the outside.

Figure 4:
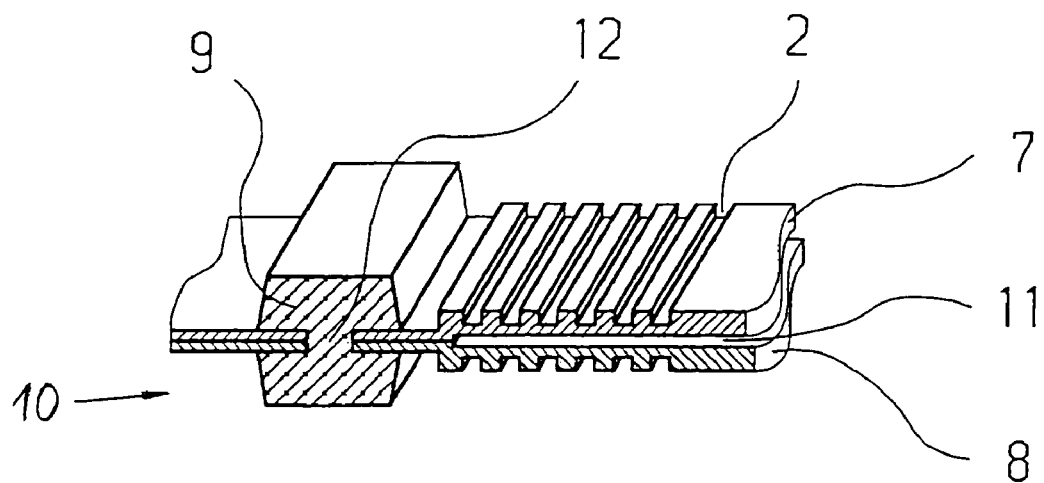
FIG. 4 is a perspective view of another embodiment of the module.
Figure 5:
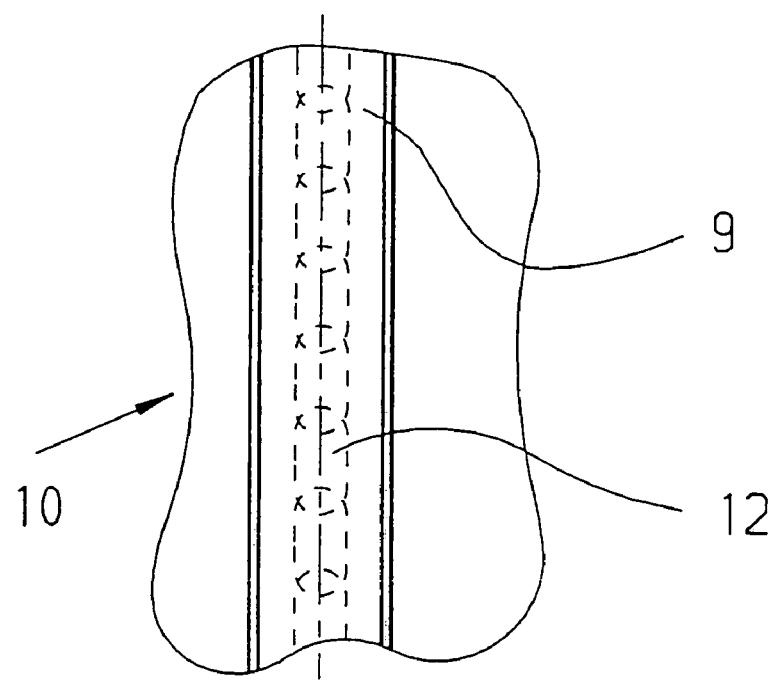
FIG. 5 is a plan view of the embodiment of the module shown in FIG. 4.

FIG. 4 shows another embodiment of the module 10 in a perspective view while FIG. 5 shows the module in an overhead view. In this embodiment, the seal element 9 is not located on the edge of the plates 7, 8, but rather in the plate interior. To produce a connection between the plates 7, 8 with the seal element 9, each of the plates is provided with openings at least partially overlapping one another. In the illustrated embodiment, the openings are each made in the form of elongated holes 12 partially overlapping one another as shown in FIG. 5. The offset between the elongated holes 12 in the one plate 7 and the other plate 8 is chosen to be much smaller than the lengthwise extension of the elongated holes 12 so that each elongated hole 12 overlaps with its two neighboring holes. In this way, the sealing of the intermediate space 11 as mentioned in connection with the FIG. 3 embodiment will be ensured. The overlapping area of the elongated holes 12 in the plates 7, 8 is filled continuously by the seal element 9, whereby the seal element 9 extends in the overlapping area from the outside surface of the one plate 7 through the lengthwise holes 12 as far as the outside surface of the other plate 8 so that in this way a positive and adhesive connection between the plates 7, 8 is produced. The cross-sectional shape of the seal element 9 corresponds to the cross-sectional shape of the seal element 9 shown in FIG. 3. It is of course to be understood that instead of the elongated holes 12, openings of other shapes can be made in the plates 7, 8. With suitable dimensioning of the size and number of elongated holes 12, it is not necessary to align the plates 7, 8 to establish a secure connection by way of the seal element 9 parallel to the lengthwise extension of the elongated holes 12 before applying the seal element 9.

Figure 6:
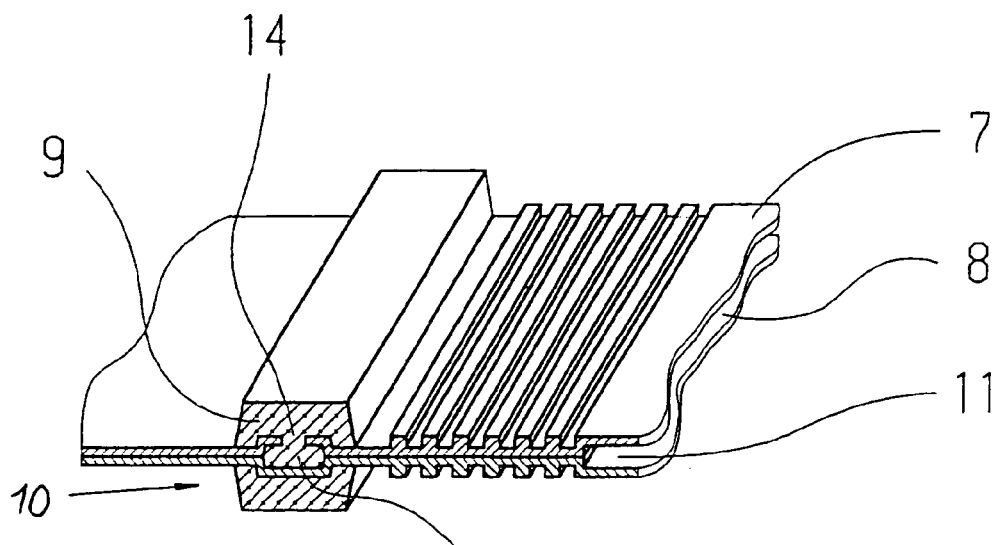
FIG. 6 is a perspective view of another version of the module.
Figure 7:
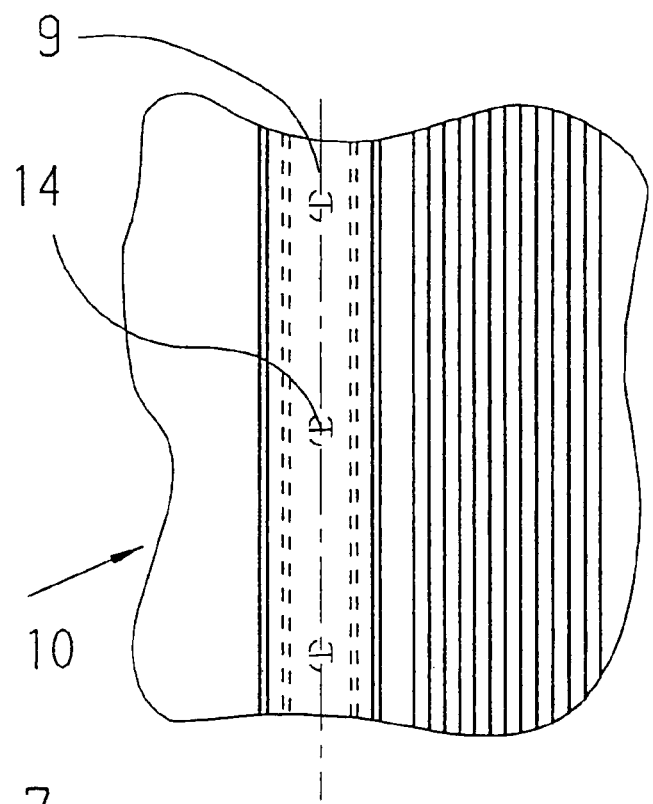
FIG. 7 is a plan view of the embodiment of the module shown in FIG. 6.

FIG. 6 shows in perspective view another embodiment of the module while FIG. 7 shows an overhead view of this same embodiment. In this embodiment, a tunnel-like cavity (or cavities) 13 is formed by the plates 7, 8 in the area in which the seal element 9 is located. The cavity 13 is accessible via openings 14 which are machined into one of the plates 7, 8 or also in the two plates 7, 8. When the seal element 9 is produced, the seal material can penetrate through the openings 14 into the cavity 13 so that the seal material is located in (e.g., fills) the cavity. In doing so, especially also with the areas of the plates 7, 8 which border the cavity 13, an adhesive and/or positive connection can be produced by which the plates 7, 8 are held together.

The embodiment of the module 10 shown in FIGS. 6 and 7 can also utilize a seal element having the same cross-sectional shape as the seal element 9 shown in FIG. 3. Filling the tunnel-like cavity 13 with seal material results in the abutting area between the two plates 7, 8 being sealed over the entire length of the tunnel-like cavity 13. With the seal element 9 in the embodiment shown, in addition to the mechanical connection of the two plates 7, 8 and the sealing of successive modules 10 against one another, sealing of the intermediate spaces 11 which have been formed between the plates 7, 8 is achieved.

Figure 8:
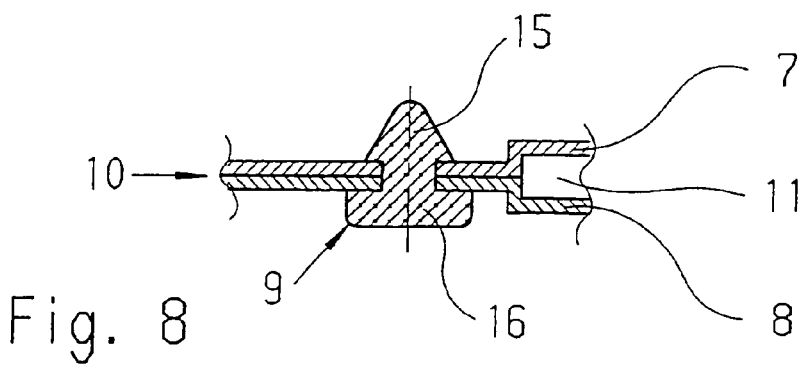
FIG. 8 is a cross-sectional view of another embodiment of the module.
Figure 9:
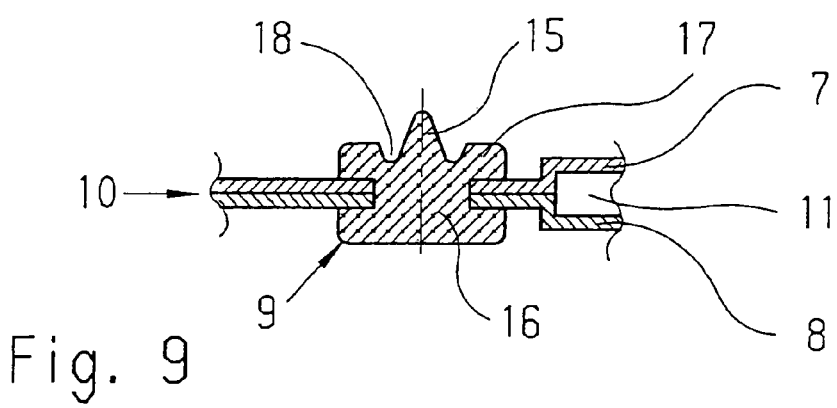
FIG. 9 is a cross-sectional view of an additional embodiment of the module.
Figure 10:
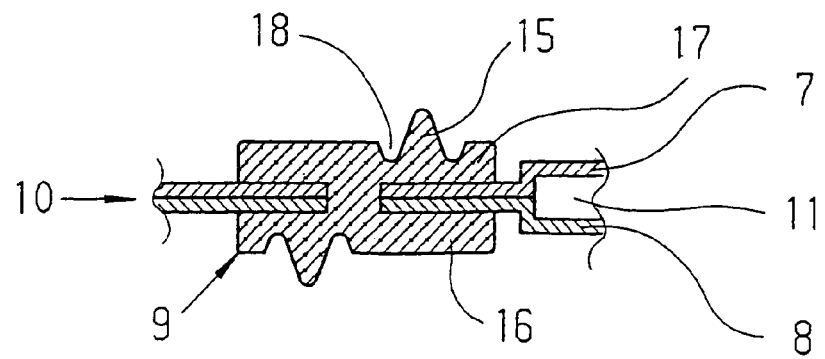
FIG. 10 is a cross-sectional view of a still further embodiment of the module.

FIGS. 8, 9 and 10 show other embodiments of the module 10. The embodiments differ in cross-sectional shape from the hexagonal cross-sectionally shaped embodiment of the seal element described above.

In FIG. 8, the cross-sectional shape of the seal element 9 is configured such that one part of the seal element on the side of one of the plates 7 possesses a tapering partial cross-section 15 while another part of the seal element on the side of the other plate 8 possesses a rectangular partial cross-section 16. In other words, on the side of the one plate 7 the seal element 9 has a tapering surface and on the side of the other plate 8 the seal element 9 has a flat surface.

With this execution of the seal element 9, when stacking the individual modules 10 on top of one another into a fuel cell arrangement, one tapering partial cross-section 15 of the seal element 9 at a time adjoins the rectangular partial cross-section 16 and thus the prerequisites for reliable sealing of the modules 10 among one another by the seal elements 9 are good.

In the embodiment of the seal element shown in FIG. 9, the part of the seal element on the side of the one plate 7 has a tapering partial cross-section 15 while the part of the seal element on the side of the other plate 8 has a rectangular cross-section 16. However, in contrast to the embodiment shown in FIG. 8, this embodiment of the seal element is configured so that the part of the seal element on the side of the one plate 7 is also provided on both sides of the tapering partial cross-section 15 with one stop area 17 having a flat surface. The tapering partial cross-section 15 projects over or beyond the stop areas 17 and is separated on either side from each of the stop areas 17 by respective recesses 18. Here the tapering partial cross-section 15 is located roughly in the middle of the lateral overall extension of the cross-section of the seal element 9. Thus, this embodiment of the seal element is configured so that one part of the seal element (i.e., the part on the side of one of the plates 7) has a generally centrally located tapering surface extending beyond flat surfaces located on either side of the tapering surface, while another part of the seal element (i.e., the part on the side of the other plate 8) has a flat surface.

The embodiment of the seal element 9 shown in FIG. 9 develops a sealing action in a manner corresponding to the embodiment shown in FIG. 8 when the modules 10 are stacked on top of one another. The embodiment shown in FIG. 9 has an additional function in this respect in that the stop areas 17, when the modules 10 are stacked on top of one another, act as a stop and prevent the tapering partial cross section 15 from being compressed too strongly and thus possibly being damaged. The recesses increase the flexibility of the cross-sectional areas or shapes with a tapering surface and hold the material which has been displaced when these cross-sectional areas or shapes are compressed. The modules can thus be handled in a relatively simple manner when stacked on top of one another into a fuel cell arrangement and the seal elements are not as likely to be damaged by excessive compression of the cross-sectional areas or shapes having the tapering surface.

The embodiment of the seal element 9 which is shown in FIG. 10 is quite similar to the embodiment illustrated in FIG. 9 and has the profiling of the seal element 9 which is present on the side of one of the plates 7 also being present on the side of the other plate 8. That is, the seal element 9 is configured so that both sides of the seal element are provided with the tapering partial cross-section 14 which is separated by the respective depression 18 from the adjoining stop areas 17 extending on either side. Another difference in the embodiment shown in FIG. 10 is that the tapering partial cross-sections 15 are not located in the middle or center of the lateral overall extension of the cross-section of the seal element 9, but rather are offset from the middle or center. Also, the tapering partial cross-sections 15 on the opposite sides of the seal element 9 are offset from the middle or center in opposite directions as depicted in FIG. 10. With this arrangement, when the modules 10 are stacked on top of one another into a fuel cell arrangement, each tapering partial cross-section 15 adjoins one of the stop areas 17, and for the two plates 7, 8 two tapering cross-sections 15 come to rest generally next to one another. This means that two seal points are located in succession and so reliable sealing by way of the seal element 9 takes place. As shown in FIG. 10, on each side of the seal element 9, one of the stop areas has a greater lateral overall extension than the other stop area.

If it is deemed advantageous taking into account the cost and benefit, the plates 7, 8 are welded to one another before extrusion coating with the injection molding material or are joined to one another in some other way. This can help achieve a relatively high mechanical load capacity while also maintaining a relatively low contact resistance between the plates 7, 8.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A fuel cell arrangement comprising:
   a first electrode comprised of first and second directly adjacent and separate stacked plates held together by a common first seal element of polymer material, each of the first and second plates being provided with an opening and the common first seal element extending through the opening in each of the first and second plates;

a second electrode comprised of third and fourth directly adjacent and separate stacked plates held together by a common second seal element of polymer material, each of the third and fourth plates being provided with an opening and the common second seal element extending through the opening in each of the third and fourth plates;

a first catalyst plate and a second catalyst plate both positioned between the first electrode and the second electrode, the first catalyst plate directly contacting the second plate of the first electrode, and the second catalyst plate directly contacting the third plate of the second electrode;

a first membrane positioned between the first catalyst plate and the second catalyst plate;

a third electrode comprised of fifth and sixth directly adjacent and separate stacked plates held together by a common third seal element of polymer material, each of the fifth and sixth plates being provided with an opening and the common third seal element extending through the opening in each of the fifth and sixth plates;

a third catalyst plate and a fourth catalyst plate positioned between the second electrode and the third electrode, the third catalyst plate directly contacting the fourth plate of the second electrode, and the fourth catalyst plate directly contacting the fifth plate of the third electrode;

a second membrane positioned between the third catalyst plate and the fourth catalyst plate; and wherein there are no catalyst plates and no membranes positioned between: 1) the first and second plates of the first electrode; 2) the third and fourth plates of the second electrode; and 3) the fifth and sixth plates of the third electrode.

2. The fuel cell arrangement according to claim 1, wherein the common first seal element is provided on surfaces of the first and second plates of the first electrode that are opposite the surfaces of the first and second plates that face one another.

3. The fuel cell arrangement according to claim 1, further comprising a first intermediate space provided between the first and second plates of the first electrode, a second intermediate space provided between the third and fourth plates of the second electrode, and a third intermediate space provided between the fifth and sixth plates of the third electrode, the common first seal element sealing the first intermediate space, the common second seal element sealing the second intermediate space, and the common third seal element sealing the third intermediate space.

4. The fuel cell arrangement according to claim 1, wherein:
the first and second plates of the first electrode have end faces, the common first seal element encompassing at least portions of the end faces of the first and second plates of the first electrode;
the third and fourth plates of the second electrode have end faces, the common second seal element encompassing at least portions of the end faces of the third and fourth plates of the second electrode; and
the fifth and sixth plates of the third electrode have end faces, the common third seal element encompassing at least portions of the end faces of the fifth and sixth plates of the third electrode.

5. A fuel cell arrangement comprising:
a first electrode comprised of first and second directly adjacent and separate stacked plates held together by a common first seal element of polymer material, each of the first and second plates possessing a first surface and an oppositely facing second surface, the first surface of the first plate facing the first surface of the second plate, the common first seal element encompassing at least a portion of an outer end face of the first plate and at least a portion of an outer end face of the second plate, and the common first seal element extending onto the second surface of the first plate and the second surface of the second plate;

a second electrode comprised of third and fourth directly adjacent and separate stacked plates held together by a common second seal element of polymer material, each of the third and fourth plates possessing a first surface and an oppositely facing second surface, the first surface of the third plate facing the first surface of the fourth plate, the common second seal element encompassing at least a portion of an outer end face of the third plate and at least a portion of an outer end face of the fourth plate, and the common second seal element extending onto the second surface of the third plate and the second surface of the fourth plate;

a first catalyst plate and a second catalyst plate both positioned between the first electrode and the second electrode, the first catalyst plate directly contacting the second plate of the first electrode, and the second catalyst plate directly contacting the third plate of the second electrode;

a first membrane positioned between the first catalyst plate and the second catalyst plate;

a third electrode comprised of fifth and sixth directly adjacent and separate stacked plates held together by a common third seal element of polymer material, each of the fifth and sixth plates possessing a first surface and an oppositely facing second surface, the first surface of the fifth plate facing the first surface of the sixth plate, the common third seal element encompassing at least a portion of an outer end face of the fifth plate and at least a portion of an outer end face of the sixth plate, and the common third seal element extending onto the second surface of the fifth plate and the second surface of the sixth plate;

a third catalyst plate and a fourth catalyst plate positioned between the second electrode and the third electrode, the third catalyst plate directly contacting the fourth plate of the second electrode, and the fourth catalyst plate directly contacting the fifth plate of the third electrode;

a second membrane positioned between the third catalyst plate and the fourth catalyst plate; and wherein there are no catalyst plates and no membranes positioned between: 1) the first and second plates of the first electrode; 2) the third and fourth plates of the second electrode; and 3) the fifth and sixth plates of the third electrode.

6. The fuel cell arrangement according to claim 5, wherein at least a portion of the first common seal element that extends onto the second surface of the second plate contacts at least a portion of the second common seal element that extends onto the second surface of the third plate.

7. A fuel cell module adapted to be positioned adjacent another fuel cell module with an interposed membrane to form a fuel cell arrangement, the fuel cell module comprising:
an electrode comprised of first and second separate and stacked plates each having a first surface and a second surface, at least a portion of the first surface of the first plate being directly adjacent at least a portion of the first surface of the second plate;

a common seal element of polymer material which at least partially joins the first and second separate and stacked plates to one another, each of the first and second plates being provided with an opening and the common seal element extending through the opening in each of the first and second plates;

a first catalyst plate directly contacting the second surface of the first plate of the electrode;

a second catalyst plate directly contacting the second surface of the second plate of the electrode; and wherein there are no catalyst plates positioned between the first surface of the first plate and the first surface of the second plate of the electrode.

8. The fuel cell module according to claim 7, wherein the common seal element adhesively joins the first and second plates of the electrode to one another.

9. The fuel cell module according to claim 7, wherein the first and second plates of the electrode are joined to one another in an interlocking manner via the common seal element.

10. The fuel cell module according to claim 7, wherein the common seal element is provided on the second surfaces of the first and second plates of the electrode.

11. The fuel cell module according to claim 7, further comprising an intermediate space between a portion of the first surface of the first plate and a portion of the first surface of the second plate, the common seal element sealing the intermediate space.

12. The fuel cell module according to claim 7, wherein the first and second plates of the electrodes have end faces, the common seal element encompassing at least portions of the end faces of the first and second plates of the electrode.

13. The fuel cell module according to claim 7, wherein the first and second plates of the electrode are each provided with a plurality of elongated openings, each of the openings in one of the plates overlapping one of the openings in the other plate.

14. The fuel cell module according to claim 7, wherein a portion of the seal element is positioned in at least cavity between the first and second plates of the electrode.

15. The fuel cell module according to claim 7, wherein a part of the common seal element is located on a side of one of the first and second plates of the electrode and has a cross-sectional configuration possessing a flat surface.

16. The fuel cell module according to claim 7, wherein a part of the common seal element is located on a side of one of the first and second plates of the electrode and has a cross-sectional configuration possessing a tapering surface.

17. The fuel cell module according to claim 7, wherein a part of the common seal element is located on a side of one of the first and second plates of the electrode and has a cross-sectional configuration possessing both a flat surface and a tapering surface.

18. The fuel cell module according to claim 7, wherein the flat surface is separated from the tapering surface by a recess which is recessed relative to the flat surface.

19. A fuel cell module adapted to be positioned adjacent another fuel cell module with an interposed membrane to form a fuel cell arrangement, the fuel cell module comprising:

an electrode comprised of first and second separate and stacked plates each having a first surface and a second surface, at least a portion of the first surface of the first plate being directly adjacent at least a portion of the first surface of the second plate;

a common seal element of polymer material which holds the first and second separate and stacked plates to one another, the common seal element encompassing at least a portion of an outer end face of the first plate and at least a portion of an outer end face of the second plate, and the common seal element extending onto the second surface of the first plate and the second surface of the second plate;

a first catalyst plate directly contacting the second surface of the first plate of the electrode;

a second catalyst plate directly contacting the second surface of the second plate of the electrode; and wherein there are no catalyst plates positioned between the first surface of the first plate and the first surface of the second plate of the electrode.

20. A process for producing a fuel cell module for a fuel cell arrangement, comprising:

inserting into a casting mold at least portions of first and second separate plates having first surfaces facing one another and oppositely facing second surfaces, each of the first and second plates being provided with an opening;

filling the casting mold with a polymer seal material so that the seal material adjoins the first and second plates and forms a common seal element extending through the opening in each of the first and second plates while the first surfaces of the first and second plates are directly adjacent one another to hold together the first and second separate plates and produce a single electrode of the fuel cell module for the fuel cell arrangement;

directly contacting the second surface of the first plate with a first catalyst plate;

directly contacting the second surface of the second plate with a second catalyst plate; and wherein there are no catalyst plates between the first surfaces of the first and second plates of the single electrode.

* * * * *